March 10, 1959  W. H. STORRS  2,876,746
FLUID ACTUATED JACK WITH PRESSURE RESPONSIVE AUTOMATIC LOCK
Filed Oct. 26, 1954  2 Sheets-Sheet 1

INVENTOR.
WILLIAM H. STORRS
BY
Lindsey and Prutzman
ATTORNEYS

INVENTOR.
WILLIAM H. STORRS

United States Patent Office

2,876,746
Patented Mar. 10, 1959

2,876,746

FLUID ACTUATED JACK WITH PRESSURE RESPONSIVE AUTOMATIC LOCK

William H. Storrs, West Hartford, Conn., assignor to The Hartford Special Machinery Co., Hartford, Conn., a corporation of Connecticut Application October 26, 1954, Serial No. 464,861

16 Claims. (Cl. 121—40)

This invention relates to jacks, and particularly to an automatic self-locking fluid-operated jack particularly suitable for supporting castings for machining operations.

In the machining of rough castings, the fact that castings coming from the mold are irregular in shape and non-uniform due to flashings, irregularities in the mold, blowouts, etc., makes it difficult to support the casting firmly and accurately. The difficulty is most sereve during the first machining operation because there is no previously machined surface available, and because the first machining usually takes off quite a bit of metal, which means that considerable pressure may be applied to the casting. It is particularly essential that the casting be well supported during the first machining operation, because the first machining produces the reference surface for the subsequent machining operations. One prior art arrangement for supporting such castings has been to provide a number of small individual jacks arranged on a jig or other support and individually adjustable to support the casting properly at all points. Jacks heretofore employed in such an arrangement, however, have had to be adjusted and locked in position individually and by hand, which has of course entailed a great amount of manual labor and required considerable time to set up a casting for machining.

The present invention has among its objects to provide an improved fluid-actuated jack which can be moved automatically into proper supporting engagement with a casting or other workpiece and, when correctly adjusted, will automatically lock itself in adjusted position.

Another object is to provide a jack which can be adjusted into engagement with a workpiece, and locked automatically, simultaneously with other similar jacks, so as to provide support for a workpiece instantaneously at many different points.

Another object is to provide such a jack which is simplified and sturdy in construction, economical to manufacture, and dependable in operation.

Another object is to provide such an automatically adjustable jack which can be conveniently controlled to make initial contact against a workpiece with very light pressure, thereby being particularly suitable for use even with light weight or delicately balanced workpieces and without danger of warpage or distortion.

Other objects will be part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
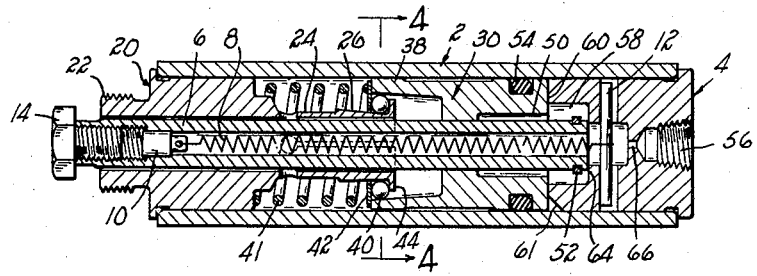
Figure 1 is a longitudinal sectional view of a jack constructed in accordance with the present invention showing the adjustable support member in retracted position.

Referring to the drawings, a jack constructed in accordance with the invention includes a cylindrical casing 2 fitted at one end with a plug or cap 4. Axially reciprocable within the casing is an inner or operating piston 6 in the form of a cylindrical tube, which comprises the thrust member of the jack. The operating piston is urged rearwardly, or to the right as shown in Figure 1, by a relatively light tension spring 8 within the piston connected at one end to a plug 10 and secured at its other end to a transverse pin 12 in the cap 4. The outer or forward end of the operating piston carries a seat in the form of a screw 14, for example, which is adapted to engage a workpiece or other object supported by the jack.

The operating piston is slidably supported in a stationary concentric collet 20 which also serves to close the forward end of the casing 2. The collet has a projecting threaded neck 22 by which the jack may be secured to a jig or other support. At its inner end, the collet has a tail portion of diminished diameter which is longitudinally split to provide a plurality of relatively resilient fingers 24 extending alongside the operating piston. Each finger 24 has a section 26 externally tapered in a rearward direction.

Figure 4:
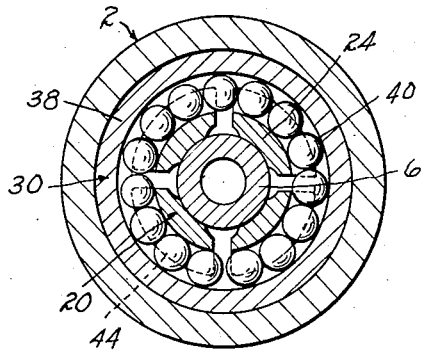
Figure 4 is an enlarged transverse sectional view of the structure of Figure 1 taken on the line 4—4 thereof.
Figure 5:
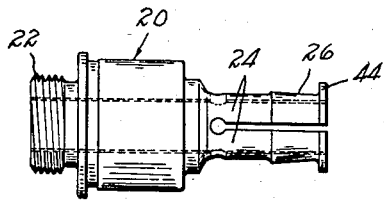
Figure 5 is a side view of one of the locking parts of the jack.

The jack also includes an outer or locking piston 30 which is concentrically slidable on the operating piston 6 and slidably engages the inside wall of the casing. A forwardly projecting sleeve 38 on the piston 30 surrounds the collet fingers 24 and has an internal taper complementary to the externally tapered portion 26 of the collet fingers. Disposed between the opposed tapered surfaces of the sleeve and collet fingers is a plurality of balls 40, arranged in a circle as best shown in Figure 4, by means of which the collet fingers may be contracted and clamped about the inner piston 6 when the locking piston 30 is displaced in a forward direction. The locking piston is urged rearwardly by a relatively heavy compression spring 41 acting between the collet and a retaining washer 42 abutting the end of the sleeve 38. For convenience of manufacture and assembly the retaining washer and an outturned flange 44 on the end of the collet fingers serve to provide a cage preventing the balls 40 from falling out of position between the collet fingers and the sleeve.

The rearward face of the locking piston has a counterbore 50 forming a small annular clearance space about the operating piston which reduces frictional engagement between the operating and locking pistons. The inner end of the counterbore forms a shoulder against which a snap ring 52 on the rearward end of the operating piston may abut to limit forward movement of the operating piston. The locking piston carries an O-ring 54 which effects a good seal with the casing and tends to retard movement of the locking piston.

Figure 2:
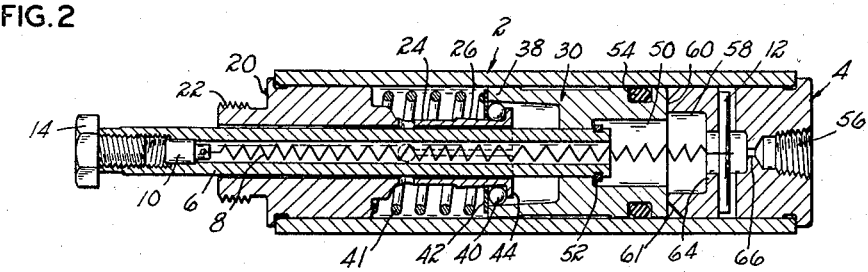
Figure 2 is another longitudinal sectional view of the jack showing the adjustable support member in extended position but unlocked.

The working fluid for the jack, which is preferably compressed air, is admitted to the cylinder through a passage 56 formed by a central throughbore in cap 4. The passage is threaded at its outer end for connection to any suitable source of pressurized working fluid, and has a counterbore 58 at its inner end exposing the central part of the working face of locking piston 30. The inner end of the cap is formed with a flat annular shoulder 60 surrounding the counterbore 58, and in its rearwardmost position, the working face of piston 30 abuts against this shoulder 60 and is partially covered by it, as shown in Figures 1 and 2. Thus only the central portion of the working face of piston 30 is exposed to counterbore 58 when the piston is in its rearwardmost position. To effect a good seat between the mating surface of locking piston 30 and the shoulder 60, the peripheral portion of the inner end of cap 4 is relieved by a bevel 61. The passage 56 has an intermediate portion of somewhat smaller diameter than the operating piston 6 which forms with the counterbore a circumferential shoulder 64, against which the operating piston abuts in its rearwardmost position. Between the outer end of the passage 56 and the shoulder 64 is a restricted portion forming an orifice 66.

Figure 3:
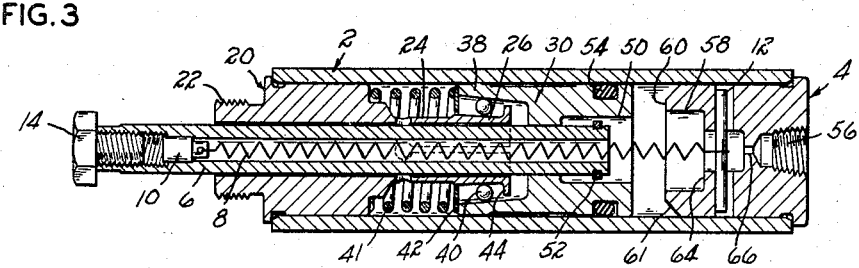
Figure 3 is another longitudinal sectional view illustrating the position of the parts with the thrust member locked in its extended position.

In the operation of the jack, when the air pressure is turned on, the pressurized air will enter the passage 56 and build up pressure behind the operating piston 6. As the pressure behind the operating piston increases sufficiently to overcome the force of spring 8, the operating piston will be moved forward automatically from the position shown in Figure 1 until the seat 14 engages the surface of the workpiece which is to be supported and stops further forward movement of the piston. Such a position is illustrated in Figure 2. The restrictive orifice 66 causes the pressure behind the operating piston to build up relatively slowly and thereby prevents the piston from jumping abruptly forward when the air is first turned on. In the initial position shown in Figure 1 the engagement of the rearward end of the operating piston 6 with the shoulder 64 initially fully isolates the locking piston from contact by the pressurized air so that when the pressurized air is first admitted within the jack, force is exerted only on the operating piston 6. Once the operating piston is unseated from the shoulder 64, the pressurized air may flow into counterbore 58, but the area of the locking piston initially exposed to the counterbore is so reduced that the initial force on piston 30 is insufficient to overcome the bias of spring 41, and no displacement of the piston 30 will take place until after fluid pressure has been built up in the chamber formed by counterbore 58 in excess of that required to move piston 6 into engagement with the workpiece. After the operating piston has been extended and seat 14 engaged with the workpiece, however, the pressure behind the locking piston builds up sufficiently to overcome the force of spring 41 and the retarding force of seal 54, and commences to displace the locking piston forwardly. As soon as the locking piston is slightly displaced in a forward direction, its rearward end becomes unseated from the shoulder 60, thereby exposing a substantially increased area of the piston working face to the air pressure. This produces a strong thrust of the locking piston forwardly, the sleeve 38 thereby compressing the collet fingers 24 and clamping the collet on the operating piston so as to automatically lock the operating piston in its extended position as shown in Figure 3. Thus it may be seen that the operating piston and locking piston operate sequentially, the locking piston being delayed sufficiently to insure that the operating piston will always be extended into proper engagement with the workpiece before being locked, while at the same time causing the locking to take place before there is any excessive pressure exerted against the workpiece by the operating piston which otherwise might cause distortion of the workpiece.

The operating piston will thereafter remain locked in its extended position and provide a secure support for a casting or other workpiece until the air pressure is released. Once the air pressure is released, the compression spring 41 will return the locking piston to its rearward position, thereby unclamping the collet fingers from the inner piston, and the spring 8 will return the operating piston to its rearwardmost position.

Thus it will be appreciated that the jack may be extended into its proper workpiece engaging position automatically, and once this position is attained the jack automatically locks itself in supporting relation with the workpiece until released. The air pressure on the operating piston is maintained without interruption until the locking operation is completed, so that the seat 14 cannot shift or drop out of supporting engagement with a workpiece while the jack is being automatically locked. Since the force required to extend the operating piston is relatively small, the force of initial engagement of seat 14 with the casting or workpiece to be supported is not enough to upset or distort the workpiece but will be sufficient to insure that the seat will firmly engage the workpiece. Moreover, the fluid pressure initially applied to the jack may be conviently adjusted as desired by a valve in the fluid supply line or the like to provide for any desired initial pressure of engagement of the seat 14 against a workpiece. Thus the jack has a wide range of adaptability for either heavy or light and delicate workpieces. For convenience and simplicity of presentation only a single jack has been shown and described. It will be understood, of course, that in the normal use of the jack, a plurality of the jacks will be utilized in combination for supporting a workpiece. These may be conveniently connected to a common air line and thereby be readily operated simultaneously so as to engage and support a single workpiece simultaneously at many different points.

Thus there has been shown and described an automatic jack which can be operated either individually or simultaneously with other similar jacks, which is automatically self-adjusting into proper supporting engagement with a workpiece or other object, and when properly engaged automatically locks itself so as to provide a secure and stable support until released. The jack is simplified and sturdy in construction, inexpensive to manufacture, dependable in operation, and capable of effecting substantial savings in time and effort in machining and other operations.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. An automatic fluid-actuated jack for supporting a workpiece comprising a cylinder forming a fluid chamber, means for engaging the workpiece including a piston mounted for axial movement in the chamber responsive to an initial fluid pressure in the chamber, and means engageable with the piston for locking the piston in a plurality of axial positions initially responsive to increased fluid pressure in the chamber when movement of the piston is restrained.

2. An automatic fluid-actuated jack for supporting a workpiece comprising a cylinder forming a fluid chamber, a piston mounted for axial movement in the chamber having means for engaging a workpiece responsive to an initial fluid pressure in the chamber, locking means for holding the piston in a plurality of extended positions, and means including a second piston in the chamber for actuating the locking means to lock the first piston initially responsive to increased fluid pressure in the chamber.

3. In a jack as defined in claim 2, an abutment with which said second piston is engageable when in initial position to reduce the effective area thereof whereby the said first piston has an effective working surface which is of greater area than the effective working surface of the second piston when the pistons are in initial position.

4. In a jack as defined in claim 2, wherein spring means are provided for returning the pistons to initial position including a first spring for biasing the first piston to initial position and a second spring of greater force than the first spring for biasing the second piston to initial position.

5. An automatic fluid-actuated jack for supporting a workpiece comprising a cylinder forming a fluid chamber, a piston mounted for axial movement in the chamber having means for engaging a workpiece responsive to an initial fluid pressure in the chamber, locking means for holding the piston in a plurality of extended positions, means including a second piston in the chamber for actuating the locking means to lock the piston responsive to increased fluid pressure in the chamber, means for returning the pistons to initial position, and means for covering a portion of the working surface of the second piston in said initial position.

6. An automatic fluid-actuated jack comprising a cylinder forming a fluid chamber, a pair of telescoping pistons mounted for axial movement in the chamber responsive to fluid pressure, one of the pistons being responsive to initial application of fluid pressure in said fluid chamber, the other of said pistons being initially responsive to an increase of fluid pressure in said fluid chamber upon restraint of movement of said one of the pistons, means on one of the pistons for engaging a workpiece, a clamp actuated by said other of said pistons for holding the said one piston in a plurality of extended positions, and means for returning the pistons to initial position.

7. A jack as defined in claim 6 wherein the clamp comprises a collet through which the said one piston extends.

8. A jack as defined in claim 6 wherein respective springs are provided for returning the piston to initial position, the spring for returning the said other piston to initial position being of greater force than the spring for returning the said one piston to initial position.

9. A jack as defined in claim 6 wherein the fluid chamber is provided with an end wall against which the said other piston abuts in initial position, said end wall being relieved to expose a portion of the working surface of the said other piston which is of smaller area than the working surface of the said one piston.

10. In an automatic fluid-actuated jack, a cylinder, an axially reciprocable operating piston extending from one end of the cylinder, means for locking the operating piston in a plurality of extended axial positions comprising an axially reciprocable locking piston in the cylinder, means for admitting pressurized fluid into the cylinder opposite the working faces of said respective pistons to cause displacement of said pistons toward said one end of the cylinder, means for delaying displacement of said locking piston relative to said operating piston including a surface in said cylinder engageable with said locking piston in its undisplaced position to isolate a portion of the working face of said locking piston from contact with said pressurized fluid, and clamp means in the cylinder operable responsive to displacement of said locking piston to lock the operating piston against displacement.

11. In an automatic fluid-actuated jack, a cylinder, a collet in the cylinder, an axially reciprocable operating piston extending through the collet, a plurality of axially extending fingers on the collet surrounding the operating piston, means for locking said operating piston in a plurality of axial positions comprising an axially reciprocable locking piston in the cylinder having a sleeve for compressing the collet fingers, means for admitting pressurized fluid into the cylinder opposite the working faces of said respective pistons, and means for delaying displacement of said locking piston relative to said operating piston including a surface in said cylinder engageable with said locking piston in its undisplaced position to isolate a portion of the working face of said locking piston from contact with said pressurized fluid.

12. In an automatic fluid-actuated jack, a cylinder having a stationary collet at its forward end, an axially reciprocable operating piston in the cylinder extending through the collet, a plurality of axially extending tapered fingers on the collet surrounding the operating piston, an axially reciprocable locking piston in the cylinder having an internally tapered sleeve surrounding the collet fingers, respective springs in the cylinder urging said pistons rearwardly, means forming a passageway adapted to be connected at its outer end to a source of pressurized fluid and opening at its inner end opposite the working faces of said pistons, and a forwardly facing surface within said cylinder engageable with a portion of the working face of said locking piston in the rearwardmost position of said locking piston to cover said working face portion against exposure to pressurized fluid.

13. In an automatic fluid-actuated jack, a cylinder, a stationary collet at one end of the cylinder, an axially reciprocable operating piston extending through the collet, a plurality of axially extending tapered fingers on the collet surrounding the operating piston, an axially reciprocable locking piston in the cylinder having an internally tapered sleeve surrounding the collet fingers, balls disposed between the sleeve and collet fingers, means forming a fluid inlet passage to the cylinder opening at its inner end opposite the working faces of said pistons, a relatively light spring biasing said operating piston toward said passage and a relatively heavy spring biasing said locking piston toward said passage.

14. In an automatic fluid-actuated jack, a cylinder having a stationary collet at its forward end, an axially reciprocable operating piston in the cylinder extending through the collet, a plurality of axially extending tapered fingers on the collet surrounding the operating piston, a coaxially mounted axially reciprocable locking piston in the cylinder having an internally tapered sleeve surrounding the collet fingers, balls between said sleeve and collet fingers, means forming a passageway in the cylinder adapted to be connected at its outer end to a source of pressurized fluid and opening at its inner end opposite the working faces of said pistons, a relatively light spring in the cylinder urging said operating piston rearwardly and a relatively heavy spring urging said locking piston rearwardly, and a forwardly facing shoulder on said cap engageable with said locking piston in the rearwardmost position thereof to cover a portion of the working face of said locking piston.

15. In an automatic fluid-actuated jack, a cylinder provided at its forward end with a stationary collet, an axially reciprocable operating piston in the cylinder extending through the collet, a plurality of axially extending fingers on the collet surrounding the operating piston, an axially reciprocable locking piston in the cylinder concentrically slidable on the operating piston having a sleeve for actuating the collet fingers, a plurality of balls between the collet fingers and the sleeve, means for admitting pressurized fluid to the cylinder and a relatively light spring urging said operating piston rearwardly, a relatively heavy spring urging said locking piston rearwardly, and a forwardly facing end wall in said cylinder engageable by a portion of the surface of said operating piston in its rearwardmost position.

16. In an automatic fluid-actuated jack, a cylinder provided at its forward end with a stationary collet, an axially reciprocable operating piston in the cylinder extending through the collet, a plurality of axially extending rearwardly tapered resilient fingers on the collet surrounding the operating piston, an axially reciprocable locking piston in the cylinder concentrically slidable on the operating piston, a sleeve on the locking piston surrounding the collet fingers and having an internal taper complementary to the taper of the collet fingers, a plurality of balls between the collet fingers and the sleeve, respective springs in the cylinder urging said pistons rearwardly, means for admitting pressurized fluid to the cylinder, and a forwardly facing end wall in the cylinder engageable with a portion of the working face of said locking piston in its rearwardmost position.

References Cited in the file of this patent

UNITED STATES PATENTS

| | | |
|---|---|---|
| 2,337,573 | Schultz | Dec. 28, 1943 |
| 2,508,240 | Fenn | May 16, 1950 |
| 2,625,910 | Michalak | Jan. 20, 1953 |
| 2,632,425 | Grover | Mar. 20, 1953 |

FOREIGN PATENTS

| | | |
|---|---|---|
| 211,847 | Germany | July 13, 1909 |
| 829,975 | France | May 2, 1938 |
| 1,042,490 | France | Nov. 2, 1953 |
| 579,294 | Great Britain | July 30, 1946 |